United States Patent
Oida et al.

(10) Patent No.: US 11,795,253 B2
(45) Date of Patent: Oct. 24, 2023

(54) COMPOSITION HAVING EXCELLENT COATING PROPERTIES

(71) Applicant: KURARAY CO., LTD., Kurashiki (JP)

(72) Inventors: Issei Oida, Tainai (JP); Daiki Noguchi, Tainai (JP); Takashi Fukumoto, Tainai (JP)

(73) Assignee: KURARAY CO., LTD., Kurashiki (JP)

( * ) Notice: Subject to any disclaimer, the term of this patent is extended or adjusted under 35 U.S.C. 154(b) by 9 days.

(21) Appl. No.: 17/417,310

(22) PCT Filed: Dec. 18, 2019

(86) PCT No.: PCT/JP2019/049583
§ 371 (c)(1),
(2) Date: Jun. 22, 2021

(87) PCT Pub. No.: WO2020/137737
PCT Pub. Date: Jul. 2, 2020

(65) Prior Publication Data
US 2022/0073667 A1   Mar. 10, 2022

(30) Foreign Application Priority Data

Dec. 26, 2018   (JP) .................. 2018-243279

(51) Int. Cl.
| | | |
|---|---|---|
| *C08F 222/10* | (2006.01) | |
| *C08F 2/48* | (2006.01) | |
| *C08F 216/04* | (2006.01) | |
| *C08F 220/32* | (2006.01) | |
| *C09D 4/00* | (2006.01) | |

(52) U.S. Cl.
CPC .......... *C08F 222/1065* (2020.02); *C08F 2/48* (2013.01); *C08F 216/04* (2013.01); *C08F 220/32* (2013.01); *C09D 4/00* (2013.01)

(58) Field of Classification Search
None
See application file for complete search history.

(56) References Cited

U.S. PATENT DOCUMENTS

| | | | | |
|---|---|---|---|---|
| 4,289,842 A * | 9/1981 | Tan ....................... | C08F 220/40 430/296 |
| 4,842,969 A * | 6/1989 | Kawatsuki ................ | G03F 1/50 430/323 |
| 5,741,552 A | 4/1998 | Takayama et al. | |
| 5,756,777 A * | 5/1998 | Shinohara ................. | C08F 8/00 549/523 |
| 6,071,226 A * | 6/2000 | Shinohara ................. | C08F 8/00 526/273 |
| 6,309,795 B1 * | 10/2001 | Abe ........................ | G03F 7/039 430/287.1 |

FOREIGN PATENT DOCUMENTS

| | | | | |
|---|---|---|---|---|
| EP | 1589054 A1 * | 10/2005 | ............ | B32B 15/08 |
| JP | 8-165269 A | 6/1996 | | |
| JP | 9-235321 A | 9/1997 | | |
| JP | 2001-200025 A | 7/2001 | | |
| JP | 2004-35599 A | 2/2004 | | |
| JP | 2004-67775 A | 3/2004 | | |
| JP | 2007-313872 A | 12/2007 | | |
| JP | 2012-97199 A | 5/2012 | | |
| JP | 2014-141654 A | 8/2014 | | |
| JP | 2015-10168 A | 1/2015 | | |

(Continued)

OTHER PUBLICATIONS

Kawatsuki et al. (1994), High temperature stable photopatternable copolymers: Synthesis, optical properties, and photopatterning process studies. J. Appl. Polym. Sci., 53: 973-983. (Year: 1994).*

(Continued)

*Primary Examiner* — Sanza L. McClendon
(74) *Attorney, Agent, or Firm* — Oblon, McClelland, Maier & Neustadt, L.L.P.

(57) ABSTRACT

The present invention relates to a composition containing a compound (A) represented by the following general formula (I) and a compound having two or more polymerizable functional groups (B) in a molecule (except for compound (A)), wherein a mass ratio ((A)/(B)) of the compound (A) to the compound having two or more polymerizable functional groups (B) in a multi-molecule is 30/70 to 50/50:

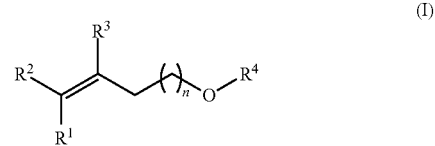

(I)

wherein, $R^1$ and $R^2$ each independently represent any one selected from the group consisting of a hydrogen atom, an alkyl group having 1 to 6 carbon atoms, an alkenyl group having 2 to 6 carbon atoms, an aryl group, and an aralkyl group; $R^3$ represents any one selected from the group consisting of an alkyl group having 1 to 6 carbon atoms, an alkenyl group having 2 to 6 carbon atoms, an aryl group, and an aralkyl group; $R^4$ represents any one selected from the group consisting of a (meth)acryloyl group, a styryl group, and an alkenyl group having 2 to 6 carbon atoms; and n represents any integer of 1 to 5.

20 Claims, No Drawings

(56) References Cited

FOREIGN PATENT DOCUMENTS

| JP | 2018-501348 A | 1/2018 | |
|---|---|---|---|
| WO | WO-2015050114 A1 * | 4/2015 | ............. B82Y 30/00 |
| WO | WO-2016089271 A1 * | 6/2016 | ............ C08F 220/18 |
| WO | WO 2019/208353 A1 | 10/2019 | |

OTHER PUBLICATIONS

International Search Report dated Mar. 3, 2020 in PCT/JP2019/049583 filed on Dec. 18. 2019, 2 pages.
Extended European Search report dated Oct. 5, 2022 in European Patent Application No. 19901614.8, 90 pages.

* cited by examiner

COMPOSITION HAVING EXCELLENT COATING PROPERTIES

TECHNICAL FIELD

The present invention relates to a composition suitable for a coating material or the like, and to a cured product obtained by curing the composition.

BACKGROUND ART

Since an active energy ray-curable resin composition can be cured at a low temperature in a short time as compared with a thermosetting resin or a two-part curable type coating material, it has been studied mainly for coating material applications.

Examples of the polyfunctional compound used in the active energy ray-curable resin composition include urethane (meth)acrylate and epoxy (meth)acrylate. By using these polyfunctional compounds, a cured film excellent in scratch resistance, adhesion, solvent resistance, chemical resistance, curling property, bending resistance, and chemical resistance can be obtained. However, a conventional active energy ray-curable resin composition has a high viscosity due to an intermolecular interaction caused by a urethane bond, a hydroxy group, or the like contained in the polyfunctional compound, and thus needs to be diluted with a solvent during coating. Therefore, conventional active energy ray-curable compositions are poor in coating workability and coating film productivity. In addition, when the active energy ray-curable composition is diluted with an organic solvent and used in order to adjust the viscosity to be suitable for coating, there is a concern about adverse effects on the environment and the human body in coating and curing under air (PTLs 1 to 4).

In order to solve the above problem, an active energy ray-curable resin composition in which the amount of an organic solvent used is reduced has been reported (PTLs 5 to 7). However, although these active energy ray-curable resin compositions in which the amount of organic solvent used has been reduced have improved coating workability, the curing rate of the coating film and the coating film performance after curing, such as optical properties, hardness, and adhesion, are still unsatisfactory, and there is room for investigation.

CITATION LIST

Patent Literature

PTL 1: JP 2004-35599 A
PTL 2: JP 2007-313872 A
PTL 3: JP 2018-501348 T
PTL 4: JP 8-165269 A
PTL 5: JP 2001-200025 A
PTL 6: JP 2004-67775 A
PTL 7: JP 2014-141654 A

SUMMARY OF INVENTION

Technical Problem

Accordingly, an object of the present invention is to provide a composition having a viscosity suitable for coating and a sufficient curing rate, and a cured product obtained by curing the composition and having excellent coating film performance.

The present inventors have conducted intensive studies to achieve the above object. As a result, it has been found that a composition having a viscosity suitable for coating and a sufficient curing rate can be obtained when a specific polyfunctional compound having an unsaturated double bond in the molecule and another polyfunctional compound are used in combination at a specific ratio, and a cured product obtained by curing the composition is excellent in optical properties, adhesion, and hardness and excellent in coating film performance. Based on these findings, the present inventors have further investigated and completed the present invention.

Solution to Problem

That is, the present invention provides the following [1] to [9].

[1] A composition containing a compound (compound (A)) represented by the following general formula (I) and a compound (polyfunctional compound (B)) having two or more polymerizable functional groups in a molecule other than the compound (A), wherein a mass ratio ((A)/(B)) of the compound (A) to the polyfunctional compound (B) is 30/70 to 50/50:

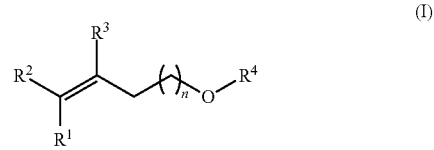

(I)

wherein, $R^1$ and $R^2$ each independently represent any one selected from the group consisting of a hydrogen atom, an alkyl group having 1 to 6 carbon atoms, an alkenyl group having 2 to 6 carbon atoms, an aryl group, and an aralkyl group; $R^3$ represents any one selected from the group consisting of an alkyl group having 1 to 6 carbon atoms, an alkenyl group having 2 to 6 carbon atoms, an aryl group, and an aralkyl group; $R^4$ represents any one selected from the group consisting of a (meth)acryloyl group, a styryl group, and an alkenyl group having 2 to 6 carbon atoms; and n represents any integer of 1 to 5.

[2] The composition as set forth in [1], wherein $R^1$ and $R^2$ in the general formula (I) in the compound (A) are hydrogen atoms, $R^3$ is a methyl group, n is 1 to 4, and $R^4$ is a (meth)acryloyl group or a styryl group.

[3] The composition as set forth in [1] or [2], wherein the polymerizable functional group in the polyfunctional compound (B) is a (meth)acryloyl group.

[4] The composition as set forth in any of [1] to [3], wherein the polyfunctional compound (B) is at least one selected from urethane (meth)acrylate and epoxy (meth)acrylate.

[5] The composition as set forth in any of [1] to [4], wherein the compound (A) is represented by the following general formula (II):

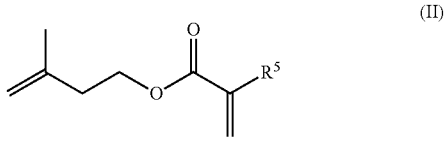

(II)

wherein $R^5$ represents a hydrogen atom or a methyl group.

[6] The composition as set forth in any of [1] to [5], further containing a polymerization initiator.

[7] The composition as set forth in any of [1] to [6], wherein a total amount of the compound (A) and the polyfunctional compound (B) is 80% by mass or more in the composition.

[8] A coating material containing the composition as set forth in any of [1] to [7].

[9] A cured product obtained by curing the composition as set forth in any of [1] to [7].

Advantageous Effects of Invention

According to the present invention, there are provided a composition having a viscosity suitable for coating and a sufficient curing rate, and a cured product obtained by curing the composition and having excellent coating film performance.

DESCRIPTION OF EMBODIMENTS

[Composition]

The composition of the present invention contains the compound (A) represented by the above-described general formula (I) and the polyfunctional compound (B), and a mass ratio of the compound (A) to the polyfunctional compound (B) ((A)/(B)) is 30/70 to 50/50. This results in a composition having a viscosity suitable for coating and a sufficient curing rate.

<Compound (A)>

The compound (A) used in the present invention is a compound represented by the following general formula (I).

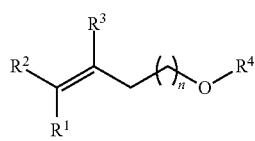

(I)

In the general formula (I), $R^1$ and $R^2$ each independently represent any one selected from the group consisting of a hydrogen atom, an alkyl group having 1 to 6 carbon atoms, an alkenyl group having 2 to 6 carbon atoms, an aryl group, and an aralkyl group; $R^3$ represents any one selected from the group consisting of an alkyl group having 1 to 6 carbon atoms, an alkenyl group having 2 to 6 carbon atoms, an aryl group, and an aralkyl group; $R^4$ represents any one selected from the group consisting of a (meth)acryloyl group, a styryl group, and an alkenyl group having 2 to 6 carbon atoms; and n represents any integer of 1 to 5.

Examples of the alkyl group having 1 to 6 carbon atoms represented by $R^1$, $R^2$, and $R^3$ include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, a cyclopropyl group, a cyclobutyl group, a cyclopentyl group, and a cyclohexyl group.

Examples of the alkenyl group having 2 to 6 carbon atoms represented by $R^1$, $R^2$, and $R^3$ include a vinyl group, an allyl group, a propenyl group, an isopropenyl group, a butenyl group, an isobutenyl group, a pentenyl group, a hexenyl group (such as cis-3-hexenyl group), and a cyclohexenyl group.

Examples of the aryl group represented by $R^1$, $R^2$, and $R^3$ include a phenyl group, a tolyl group, a xylyl group, and a naphthyl group.

Examples of the aralkyl group represented by $R^1$, $R^2$, and $R^3$ include a benzyl group, a 2-phenylethyl group, a 2-naphthylethyl group, and a diphenylmethyl group.

$R^1$ and $R^2$ are each preferably any one selected from the group consisting of a hydrogen atom, an alkyl group having 1 to 6 carbon atoms, and an alkenyl group having 2 to 6 carbon atoms, more preferably a hydrogen atom or an alkyl group having 1 to 6 carbon atoms, still more preferably a hydrogen atom or an alkyl group having 1 to 4 carbon atoms, and particularly preferably a hydrogen atom or a methyl group. Among them, it is preferable that both of $R^1$ and $R^2$ are hydrogen atoms.

$R^3$ is preferably any one selected from the group consisting of an alkyl group having 1 to 6 carbon atoms and an alkenyl group having 2 to 6 carbon atoms, more preferably an alkyl group having 1 to 6 carbon atoms, still more preferably an alkyl group having 1 to 4 carbon atoms, and particularly preferably a methyl group.

$R^4$ represents any one selected from the group consisting of a (meth)acryloyl group, a styryl group, and an alkenyl group having 2 to 6 carbon atoms. In the description herein, the term "(meth)acryloyl group" means either an acryloyl group or a methacryloyl group. In addition, (meth)acrylic acid, (meth)acrylate, and (meth)acryloyloxy group are also treated in the same manner.

Examples of the alkenyl group having 2 to 6 carbon atoms represented by $R^4$ include a vinyl group, an allyl group, a propenyl group, an isopropenyl group, a butenyl group, an isobutenyl group, a pentenyl group, a hexenyl group (such as cis-3-hexenyl group), and a cyclohexenyl group, and an alkenyl group having 2 to 5 carbon atoms is preferable.

Among these, $R^4$ is preferably a (meth)acryloyl group or a styryl group, and more preferably a (meth)acryloyl group, because it can function effectively as a polymerizable group and the effect of the present invention is more remarkably exhibited.

In the general formula (I), n represents any integer of 1 to 5. Said n is preferably any integer of 1 to 4, more preferably 1 or 2, and still more preferably 1. Since the compound of the general formula (I) has a plurality of polymerizable functional groups, the compound can be cured by polymerization. In addition, since the influence of intermolecular interaction is suppressed to be a low level, the compound has a feature that the viscosity hardly increases.

Specific examples of the compound (A) include the following compounds.

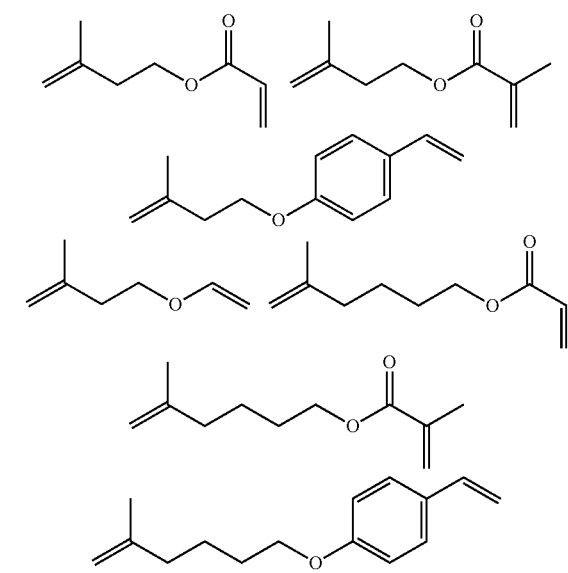

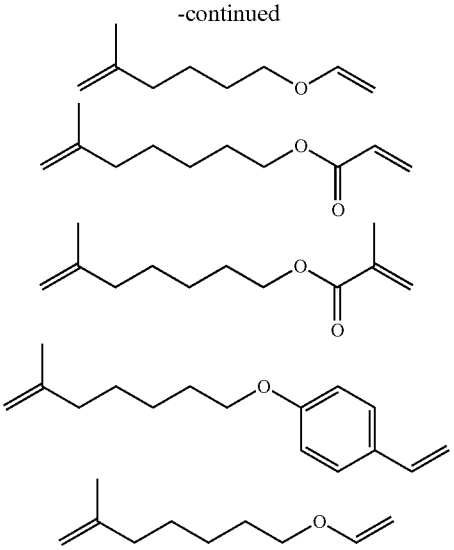

The compound (A) is preferably a compound represented by the following general formula (II) from the viewpoint of availability of raw materials and the like.

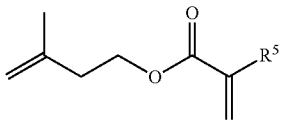

(II)

In the general formula (II), W represents a hydrogen atom or a methyl group.

The method for producing the compound (A) is not particularly limited, and the compound (A) can be produced by applying known methods alone or in combination as appropriate. For example, the compound represented by the following (A-1) can be produced by reacting 3-methyl-3-buten-1-ol, which is a corresponding alcohol, with methyl methacrylate in the presence of a transesterification catalyst such as a base.

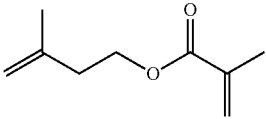

(A-1)

In the composition of the present invention, only one kind of the compound (A) may be contained, or two or more kinds thereof may be contained.

<Polyfunctional Compound (B)>

The composition of the present invention further contains a polyfunctional compound (B) in addition to the compound (A). Here, the polyfunctional compound (B) is a polymerizable polyfunctional compound other than the compound (A), and means a compound having two or more polymerizable functional groups in the molecule (except for the compound (A)). Examples of the polymerizable functional group include a radical polymerizable functional group such as a (meth)acryloyl group and a vinyl group, and a cationic polymerizable functional group such as an epoxy group, and the polyfunctional compound (B) is preferably a compound having one or more (preferably two or more) radical polymerizable functional groups in the molecule.

Specific examples of the polyfunctional compound (B) include a polyvalent (meth)acrylic ester having one or more (preferably two or more) (meth)acryloyloxy groups in the molecule, and an unsaturated polyester resin, and among these, a polyvalent (meth)acrylic ester having one or more (preferably two or more) (meth)acryloyloxy groups in the molecule is preferable, and urethane (meth)acrylate and epoxy (meth)acrylate are particularly preferable from the viewpoint of the curing rate of the obtained composition and the coating film performance after curing. In the composition of the present invention, only one kind of the polyfunctional compound (B) may be contained, or two or more kinds thereof may be contained.

Examples of the urethane (meth)acrylate include a urethane (meth)acrylate obtained by adding a hydroxy group-containing (meth)acrylic ester to an isocyanate group-remaining polymer synthesized from a polyhydric alcohol compound and a polyvalent isocyanate compound in which the amount of an isocyanate group exceeds the equivalent amount of an alcohol group.

Examples of the polyhydric alcohol include ethylene glycol, 1,2-propanediol, 1,3-propanediol, neopentyl glycol, hydrogenated bisphenol A, and hydrogenated bisphenol F.

Examples of the polyvalent isocyanate include trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, 2,2,4- or 2,4,4-trimethylhexamethylene diisocyanate, lysine diisocyanate, diphenylmethane diisocyanate, and isophorone diisocyanate. Among these, hexamethylene diisocyanate is preferable because of its excellent curability.

The urethane (meth)acrylate is preferably a urethane (meth)acrylate obtained by reacting hexamethylene diisocyanate as a polyvalent isocyanate with pentaerythritol tri(meth)acrylate as a hydroxy group-containing (meth)acrylic ester.

Examples of the epoxy (meth)acrylate include those obtained by adding (meth)acrylic acid to an epoxy resin such as those obtained by adding (meth)acrylic acid to the terminal of a bisphenol A-type epoxy resin.

Examples of the unsaturated polyester resin include copolymerized polyesters of polyhydric alcohols and (α,β-unsaturated polybasic acids/polybasic acids) such as propylene glycol-(phthalic anhydride/maleic anhydride) copolymerized polyesters and ethylene glycol-(phthalic anhydride/maleic anhydride) copolymerized polyesters, and these copolymerized polyesters may be used alone or in combination with radical polymerizable monomers such as styrene. In addition, these copolymerized polyesters may further contain a glycidyl compound of an unsaturated alcohol such as allyl glycidyl ether as one of the copolymerization components.

The mass ratio ((A)/(B)) of the compound (A) to the polyfunctional compound (B) in the composition of the present invention is 30/70 to 50/50, and is preferably 35/65 to 45/55 from the viewpoints of the viscosity of the composition, the curing rate, the coating film performance after curing, and the like. When the mass ratio ((A)/(B)) is less than 30/70, the solution viscosity of the composition becomes high, and the coating properties deteriorate. On the other hand, when the mass ratio ((A)/(B)) is more than 50/50, the curing rate of the composition tends to decrease, and the coating film performance after curing also tends to decrease.

The total content of the compound (A) and the polyfunctional compound (B) in the composition of the present invention is not particularly limited, but is preferably 5% by mass or more, more preferably 10% by mass or more, still more preferably 50% by mass or more, particularly preferably 80% by mass or more, and most preferably 90% by mass or more, based on the mass of the composition of the present invention, because the effect of the present invention is more remarkably exhibited.

<Polymerization Initiator>

The composition of the present invention preferably further contains a polymerization initiator, for example, in order to further improve the curability. The type of the polymerization initiator is not particularly limited and may be appropriately selected depending on the type of the polyfunctional compound (B) to be used. Specifically, a radical polymerization initiator, a cationic polymerization initiator, an anionic polymerization initiator, or the like can be used, and a radical polymerization initiator is preferable because the effect of the present invention is more remarkably exhibited. Examples of the radical polymerization initiator include a thermal radical polymerization initiator that generates radicals by heat, and a photo radical polymerization initiator that generates radicals by light.

Specific examples of the polymerization initiator include organic peroxides such as diacyl peroxides such as benzoyl peroxide; peroxy esters such as t-butyl peroxy benzoate; hydroperoxides such as cumene hydroperoxide; dialkyl peroxides such as dicumyl peroxide; ketone peroxides such as methyl ethyl ketone peroxide and acetylacetone peroxide; peroxyketals; alkyl peresters; and percarbonates.

As the radical polymerization initiator, a commercially available product may also be used. Examples thereof include Irgacure (registered trademark, the same shall apply hereinafter) 651, Irgacure 184, Irgacure 2959, Irgacure 127, Irgacure 907, Irgacure 369, Irgacure 379, Irgacure 819, Irgacure 784, Irgacure OXE01, Irgacure OXE02, and Irgacure 754 (all manufactured by BASF). These may be used alone, or two or more kinds thereof may be used in combination.

The content of the polymerization initiator in the composition of the present invention is not particularly limited, but is preferably 0.001% by mass or more, more preferably 0.01% by mass or more, still more preferably 0.1% by mass or more, and particularly preferably 1% by mass or more, and is preferably 10% by mass or less and more preferably 5% by mass or less, based on the mass of the composition of the present invention, because the effect of the present invention is more remarkably exhibited.

<Other Components>

The composition of the present invention may further contain other components other than the compound (A), the polyfunctional compound (B), and the polymerization initiator described above, such as other resin, a diluent, an organic solvent, a pigment, a dye, a filler, an ultraviolet absorber, a viscosity improver, a shrinkage reducing agent, an aging inhibitor, a plasticizer, an aggregate, a flame retardant, a stabilizer, a fiber reinforcement, an antioxidant, a leveling agent, and an anti-sagging agent.

Examples of the other resin include a vinyl ester resin, a fluororesin, a polyamide resin (such as polyamide 66), a polycarbonate resin, a polyurethane resin, and a poly (meth) acrylamide resin. Examples of the diluent include styrene and (meth)acrylic ester, and from the viewpoint of polymerizability, (meth)acrylic ester is preferable. Examples of the pigment include titanium oxide, red iron oxide, aniline black, carbon black, cyanine blue, and chrome yellow. Examples of the filler include talc, mica, kaolin, calcium carbonate, and clay.

[Method for Producing Composition]

The method for producing the composition of the present invention is not particularly limited, and the composition can be produced by mixing the compound (A), the polyfunctional compound (B), and if necessary, a polymerization initiator and other components.

The viscosity of the composition of the present invention can be adjusted to a desired range by adjusting the mass ratio of the compound (A) to the polyfunctional compound (B) ((A)/(B)) or by adding a diluent or an organic solvent within a range that does not impair the effect of the present invention. The viscosity (25° C.) of the composition of the present invention is preferably 120 mPa·s or less from the viewpoint of coatability or the like when the composition is applied to a base material. The viscosity can be measured by the method described later in Examples.

[Curing Method]

The method for curing the composition of the present invention is not particularly limited, and may be appropriately selected depending on the type of the polyfunctional compound (B) and the polymerization initiator to be used. For example, when the composition of the present invention contains a photo radical polymerization initiator, a method of curing by irradiation with an active energy ray may be mentioned, and when the composition contains a thermal radical polymerization initiator, a method of curing by heating may be mentioned.

In the case of containing both of them, heating may be performed after irradiation with an active energy ray. Although it depends on the application, the method of curing by irradiation with an active energy ray is preferable because the effect of the present invention is more remarkably exhibited.

Examples of the active energy rays used for curing the composition coated on the base material include light rays such as far ultraviolet rays, ultraviolet rays, near ultraviolet rays, and infrared rays, electromagnetic waves such as X-rays and γ-rays, as well as electron rays, proton rays, and neutron rays, but curing by irradiation with ultraviolet rays is advantageous in view of curing rate, availability of irradiation apparatus, and cost. When electron beam irradiation is performed, curing can be performed without using a photo radical polymerization initiator.

When the composition is cured by applying a method of curing by irradiation with active energy rays such as ultraviolet rays, the composition may be irradiated with active energy rays until the uncured portion of the coating film and the tack after curing are eliminated. If the amount of active energy rays irradiated until the uncured portion and the tack are eliminated (integrated irradiation amount) is 1,500 mJ/cm$^2$ or less, the curing rate is high and it is suitable for production.

[Use of Composition]

The use of the composition of the present invention is not particularly limited, and the composition can be preferably used in applications such as coating materials, adhesives, inks, coating agents, and ultraviolet curable inkjet inks. Among these, the composition of the present invention is particularly preferably used as a coating material because the composition has a viscosity suitable for coating, has a sufficient curing rate by allowing a polymerization curing reaction to sufficiently proceed even in the presence of oxygen such as in an air atmosphere, and is excellent in coating film performance (optical properties, adhesion, hardness, and the like) after curing.

EXAMPLES

Hereinafter, the present invention will be described in detail with reference to Examples, but the present invention is not limited to these Examples.

Various materials used in the following Examples and Comparative Examples are shown below.

3-Methyl-1-methacryloyloxy-3-butene (A-1): manufactured by Kuraray Co., Ltd., purity: 99%

3-Methyl-1-acryloyloxy-3-butene (A-2): manufactured by Kuraray Co., Ltd., purity: 98%

1,6-Hexanediol diacrylate (A-3): "LIGHT ACRYLATE 1.6HX-A" (manufactured by Kyoeisha Chemical Co., Ltd.)

Tripropylene glycol diacrylate (A-4): "APG-200" (manufactured by Shin-Nakamura Chemical Co., Ltd.)

Polyethylene glycol (average degree of polymerization: 4) Diacrylate (A-5):A-200 (manufactured by Shin-Nakamura Chemical Co., Ltd.)

Urethane acrylate (UA): Synthesized from hexamethylene diisocyanate trimer "Duranate TPA-100" (manufactured by Asahi Kasei Corporation) and pentaerythritol triacrylate according to the method described in Comparative Example 6 of WO 2014/061539.

Epoxy acrylate (EA): "BTAEM-100" (manufactured by KSM Co., Ltd.) Polymerization initiator: 1-hydroxycyclohexane-1-ylphenylketone "Irgacure 184" (manufactured by BASF)

Evaluation methods employed in the following Examples and Comparative Examples are shown below.

[Viscosity]

The solution viscosity at 25° C. was measured using an RE type viscometer ("RE85U" manufactured by Toki Sangyo Co., Ltd.) when the solution viscosity was 100 mPa·s or more, and using a TV-20 type viscometer ("TVE-20H" manufactured by Toki Sangyo Co., Ltd.) when the solution viscosity was less than 100 mPa·s.

[Curing Rate]

Using a small-sized UV conveyor ("QRM-2288-Wc" manufactured by ORC Manufacturing Co., Ltd.), ultraviolet rays were irradiated from a metal halide lamp (SMX-30001E-FS) as a light source, the number of times of irradiation was repeated until an uncured portion and a tack were eliminated by finger touch, and the integrated irradiation amount required for the irradiation was defined as a curing rate. Here, the UV irradiation amount at one time was 500 mJ/cm$^2$. The smaller the value of the integrated irradiation amount, the higher the curing rate.

[Film Thickness]

The film thickness was measured using "DIGIMATIC Micrometer MDE-25PJ" (manufactured by Mitutoyo Corporation).

[Transmittance and Haze]

Using a haze meter "NDH5000" (manufactured by Nippon Denshoku Industries Co., Ltd.), transmittances and hazes were measured in conformity with JIS K7361-1 and JIS K7136.

[Adhesion]

A cross-cut test (100 squares cut) was performed in conformity with JIS K5600-5-6, and the number of squares remaining after peeling was used as an indicator of adhesion. Note that the case of 100 indicates that peeling did not occur.

[Pencil Hardness]

Measurement was carried out in conformity with JIS K5600-5-4 under the conditions of an angle of 45° and a load of 750 g using Mitsubishi Pencil uni.

Example 1

A photocurable resin composition was prepared by blending 40 parts by mass of 3-methyl-1-methacryloyloxy-3-butene (A-1), 60 parts by mass of urethane acrylate (UA), and 3 parts by mass of a polymerization initiator. The prepared composition was applied onto polyethylene terephthalate ("COSMOSHINE A4100" manufactured by Toyobo Co., Ltd.) using an applicator so as to have a dry film thickness of 5 μm, thereby preparing a coating film. Subsequently, after removing the solvent at 80° C. for one minute, ultraviolet rays were irradiated using a small-sized UV conveyor ("QRM-2288-Wc" manufactured by ORC Manufacturing Co., Ltd.) with a metal halide lamp as a light source until the integrated irradiation amount was reached. The obtained cured product was evaluated according to each of the evaluation methods described above. The results are shown in Table 1.

Example 2

A photocurable resin composition was prepared in the same manner as in Example 1 except that 3-methyl-1-acryloyloxy-3-butene (A-2) was used instead of 3-methyl-1-methacryloyloxy-3-butene (A-1), and each evaluation was performed in the same manner as in Example 1. The results are shown in Table 1.

Example 3

A photocurable resin composition was prepared in the same manner as in Example 1 except that epoxy acrylate (EA) was used instead of urethane acrylate (UA), and each evaluation was performed in the same manner as in Example 1. The results are shown in Table 1.

Example 4

A photocurable resin composition was prepared in the same manner as in Example 1 except that 3-methyl-1-acryloyloxy-3-butene (A-2) was used instead of 3-methyl-1-methacryloyloxy-3-butene (A-1) and epoxy acrylate (EA) was used instead of urethane acrylate (UA), and each evaluation was performed in the same manner as in Example 1. The results are shown in Table 1.

Comparative Example 1

A photocurable resin composition was prepared in the same manner as in Example 1 except that 1,6-hexanediol diacrylate (A-3) was used instead of 3-methyl-1-methacryloyloxy-3-butene (A-1), and each evaluation was performed in the same manner as in Example 1. The results are shown in Table 1.

Comparative Example 2

A photocurable resin composition was prepared in the same manner as in Example 1 except that tripropylene glycol diacrylate (A-4) was used instead of 3-methyl-1-methacryloyloxy-3-butene (A-1), and each evaluation was performed in the same manner as in Example 1. The results are shown in Table 1.

Comparative Example 3

A photocurable resin composition was prepared in the same manner as in Example 1 except that polyethylene glycol diacrylate (A-5) was used instead of 3-methyl-1-methacryloyloxy-3-butene (A-1), and each evaluation was performed in the same manner as in Example 1. The results are shown in Table 1.

Comparative Example 4

A photocurable resin composition was prepared by blending 10 parts by mass of 3-methyl-1-methacryloyloxy-3-butene (A-1), 90 parts by mass of urethane acrylate (UA), and 3 parts by mass of a polymerization initiator. Using this photocurable resin composition, each evaluation was performed in the same manner as in Example 1. The results are shown in Table 1.

Comparative Example 5

A photocurable resin composition was prepared by blending 60 parts by mass of 3-methyl-1-methacryloyloxy-3-butene (A-1), 40 parts by mass of urethane acrylate (UA), and 3 parts by mass of a polymerization initiator. Using this photocurable resin composition, each evaluation was performed in the same manner as in Example 1. The results are shown in Table 1.

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| | Compound (A) | A-1 | A-2 | A-1 | A-2 | A-3 | A-4 | A-5 | A-1 | A-1 |
| | Polyfunctional compound (B) | UA | UA | EA | EA | UA | UA | UA | UA | UA |
| | Mass ratio (A)/(B) | 40/60 | 40/60 | 40/60 | 40/60 | 40/60 | 40/60 | 40/60 | 10/90 | 60/40 |
| Composition | Viscosity (mPa·s, 25° C.) | 120 | 100 | 100 | 20 | 480 | 1200 | 140 | 15000 | 15 |
| Curing rate | Integrated irradiation amount (mJ/cm$^2$) | 1000 | 500 | 1500 | 1000 | 1000 | 1000 | 1500 | 500 | 2000 |
| Cured product | Transmittance (%) | 91.6 | 91.6 | 90.9 | 91.0 | 91.7 | 91.2 | 91.1 | 91.2 | 91.2 |
| | Haze | 0.40 | 0.40 | 0.60 | 0.70 | 0.70 | 0.59 | 0.81 | 0.59 | 0.59 |
| | Adhesion | 100 | 100 | 100 | 100 | 100 | 100 | 100 | 100 | 100 |
| | Pencil hardness | 3 H | 3 H | 3 H | 3 H | 3 H | 3 H | 3 H | 3 H | 3 H |

As shown in Table 1, it can be seen that the photocurable resin compositions of Examples 1 to 4 have a favorable curing rate while having an appropriate viscosity, and the obtained cured products are excellent in optical properties, adhesion, and hardness, and have favorable coating film performance after curing. Therefore, the composition of the present invention can achieve both workability of coating and curing and coating film performance after curing particularly when used as a coating material. On the other hand, the photocurable resin compositions of Comparative Examples 1 to 4 were poor in coating workability and coating film productivity. In addition, the photocurable resin composition of Comparative Example 5 has a low curing rate and is not practical.

The invention claimed is:

1. A composition, comprising:
   a compound (A) of formula (II)

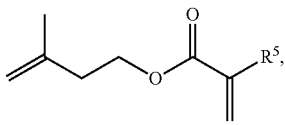

(II)

R$^5$ being H or a methyl group; and
   a polyfunctional compound (B), having two or more polymerizable functional groups,
   wherein the polyfunctional compound (B) differs from the compound (A),
   wherein an (A)/(B) mass ratio of the compound (A) to the polyfunctional compound (B) is in a range of from 30/70 to 50/50,
   wherein the composition comprises the compound (A) and the polyfunctional compound (B) in a total amount of 80% by mass or more, relative to total composition mass, and
   wherein the polymerizable functional group in the polyfunctional compound (B) is a (meth)acryloyl group.

2. The composition of claim 1, wherein the polyfunctional compound (B) is at least one selected from the group consisting of urethane (meth)acrylate and epoxy (meth)acrylate.

3. The composition of claim 1, further comprising a polymerization initiator.

4. The composition of claim 1, wherein a total amount of the compound (A) and the polyfunctional compound (B) is 90% by mass or more in the composition.

5. A coating material, comprising the composition of claim 1.

6. A cured product, obtained by curing the composition of claim 1.

7. The composition of claim 3, wherein the polyfunctional compound (B) comprises the urethane (meth)acrylate.

8. The composition of claim 3, wherein the polyfunctional compound (B) comprises the epoxy (meth)acrylate.

9. The composition of claim 3, wherein the polyfunctional compound (B) comprises the urethane (meth)acrylate, obtained by adding a hydroxy group-comprising (meth) acrylic ester to an isocyanate group-comprising polymer synthesized from a polyhydric alcohol compound and a polyvalent isocyanate compound in which an isocyanate group amount exceeds an alcohol group equivalent amount.

10. The composition of claim 9, wherein the polyhydric alcohol comprises ethylene glycol.

11. The composition of claim 9, wherein the polyhydric alcohol comprises 1,2-propanediol.

12. The composition of claim 9, wherein the polyhydric alcohol comprises 1,3-propanediol.

13. The composition of claim 9, wherein the polyhydric alcohol comprises neopentyl glycol.

14. The composition of claim 9, wherein the polyhydric alcohol comprises hydrogenated bisphenol A.

15. The composition of claim 9, wherein the polyhydric alcohol comprises hydrogenated bisphenol F.

16. The composition of claim 9, wherein the polyvalent isocyanate comprises hexamethylene diisocyanate.

17. The composition of claim 9, wherein the polyvalent isocyanate comprises trimethylene diisocyanate, tetramethylene diisocyanate, and/or pentamethylene diisocyanate.

18. The composition of claim 9, wherein the polyvalent isocyanate comprises 1,2-propylene diisocyanate, 1,2-butylene diisocyanate, 2,3-butylene diisocyanate, 1,3-butylene diisocyanate, 2,2,4-trimethylhexamethylene diisocyanate, and/or 2,4,4-trimethylhexamethylene diisocyanate.

19. The composition of claim 9, wherein the polyvalent isocyanate comprises lysine diisocyanate, diphenylmethane diisocyanate, and/or isophorone diisocyanate.

20. The composition of claim 1, having a viscosity at 25° C. of 120 mPa·s or less.

* * * * *